(12) United States Patent
Brown et al.

(10) Patent No.: US 11,194,923 B2
(45) Date of Patent: Dec. 7, 2021

(54) SYSTEMS AND METHODS FOR PROVIDING SECURE DATABASE INTERFACE SYSTEMS WITHIN AN ENCRYPTED DEVICE SYSTEM

(71) Applicant: Interactive Media Corp., Millis, MA (US)

(72) Inventors: Donald Brown, Norfolk, MA (US); Nathan Cote, North Attleboro, MA (US); Gautam Kandpal, Chelmsford, MA (US)

(73) Assignee: INTERACTIVE MEDIA CORP., Millis, MA (US)

( * ) Notice: Subject to any disclaimer, the term of this patent is extended or adjusted under 35 U.S.C. 154(b) by 79 days.

(21) Appl. No.: 16/512,777

(22) Filed: Jul. 16, 2019

(65) Prior Publication Data

US 2020/0034562 A1 Jan. 30, 2020

Related U.S. Application Data

(60) Provisional application No. 62/711,038, filed on Jul. 27, 2018.

(51) Int. Cl.
  *G06F 21/60* (2013.01)
  *G06F 21/62* (2013.01)
(52) U.S. Cl.
  CPC ........ *G06F 21/6227* (2013.01); *G06F 21/602* (2013.01); *G06F 21/606* (2013.01)

(58) Field of Classification Search
CPC .. G06F 21/6227; G06F 21/606; G06F 21/602; G06F 21/6245
See application file for complete search history.

(56) References Cited

U.S. PATENT DOCUMENTS

| | | | | |
|---|---|---|---|---|
| 10,628,334 B2* | 4/2020 | Ruiz Altamirano | .. | G06F 3/0637 |
| 2002/0111920 A1* | 8/2002 | Tresser | .................. | G06Q 30/02 |
| | | | | 705/74 |
| 2009/0132816 A1* | 5/2009 | Lee | ......................... | G06F 9/455 |
| | | | | 713/164 |
| 2009/0281836 A1* | 11/2009 | Velarde | .................. | G16H 10/65 |
| | | | | 705/3 |
| 2010/0083368 A1* | 4/2010 | Kristensen | .............. | G06F 21/34 |
| | | | | 726/18 |
| 2012/0317422 A1* | 12/2012 | Liu | ......................... | H04L 63/08 |
| | | | | 713/189 |
| 2015/0172739 A1* | 6/2015 | Shaw | ................. | H04N 21/4181 |
| | | | | 725/31 |
| 2017/0364637 A1* | 12/2017 | Kshepakaran | ......... | G16H 10/60 |
| 2018/0295105 A1* | 10/2018 | Feng | ...................... | H04W 4/80 |

OTHER PUBLICATIONS

Extended European Search Report issued by the European Patent Office dated Nov. 29, 2019 in related European Patent Application No. 19188802.3, 15 pages.

(Continued)

*Primary Examiner* — Ali S Abyaneh
(74) *Attorney, Agent, or Firm* — Gesmer Updegrove LLP

(57) ABSTRACT

An encrypted device system is disclosed that includes an interface for providing the transmission of data between an encrypted data storage medium and a computer system such that a user-interactive application program may be accessed and used via the computer system.

6 Claims, 24 Drawing Sheets

(56) References Cited

OTHER PUBLICATIONS

Anciaux et al., "Pluggable personal servers," Proceedings of The 2010 International Confeerence On Management of Data, SIGMOD '10, ACM Press, New York, New York, USA, Jun. 6, 2010, pp. 1235-1238.
Toubba, "Employing Encryption to Secure Consumer Data," Information Systems Security, vol. 14, No. 3, Jul. 1, 2006, pp. 46-54.
Wright et al., "Encryption Characteristics of Two USB-based Personal Health Record Devices," Journal of the American Medical Informatics Association, Elsevier, Amsterdam, NL, vol. 14, No. 4, Jul. 1, 2007, pp. 397-399.
Communication pursuant to Article 94(3) EPC issued by the European Patent Office in related European Patent Application No. 19188802.3 dated Feb. 4, 2021, 10 pages.

* cited by examiner

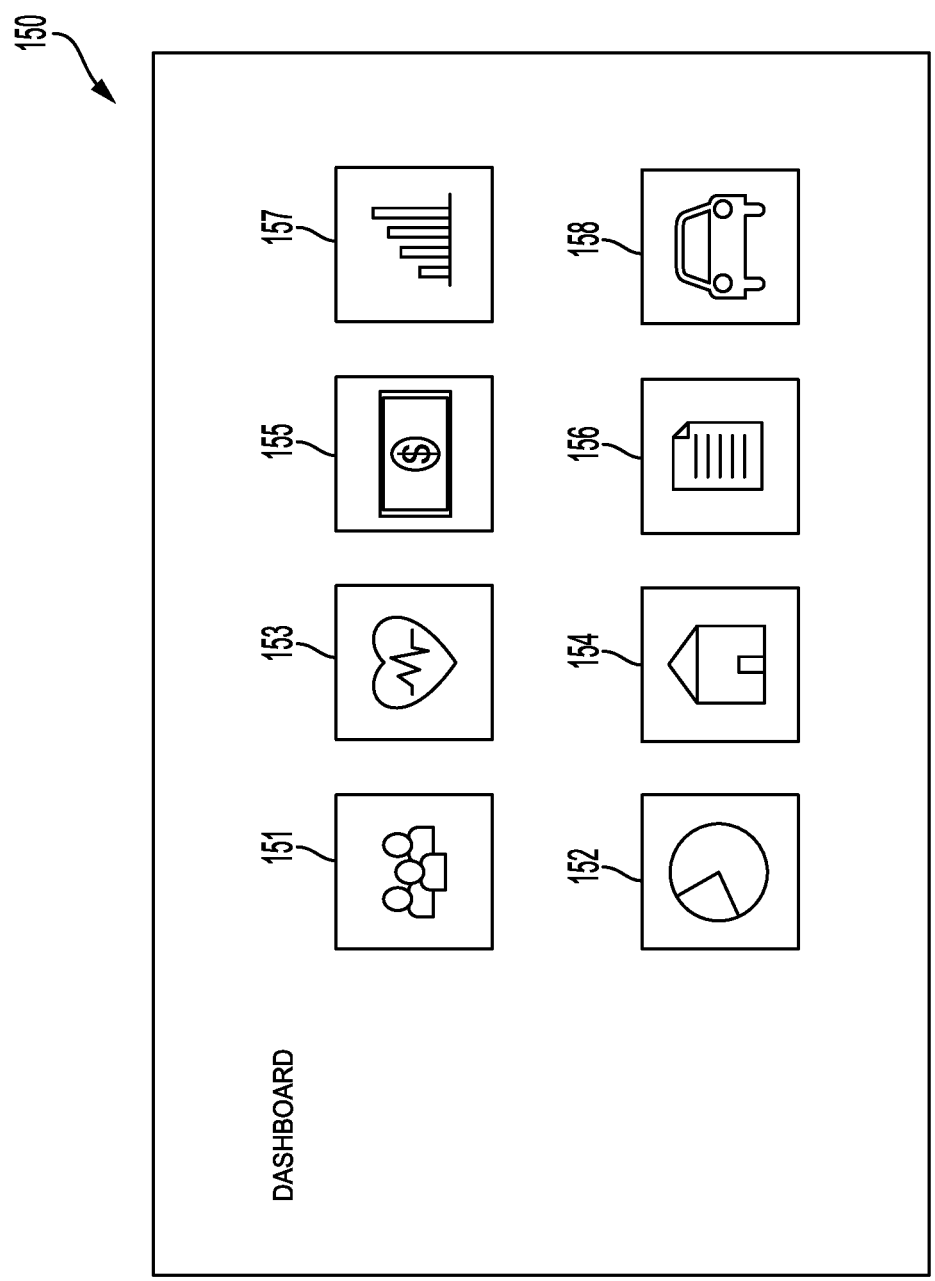

STARTING THE LP

ACCOUNT SETUP

LOGIN WITH PASSWORD

LOGIN WITH ANSWERS

FIG. 10 RESET PASSWORD

CHANGE ANSWERS

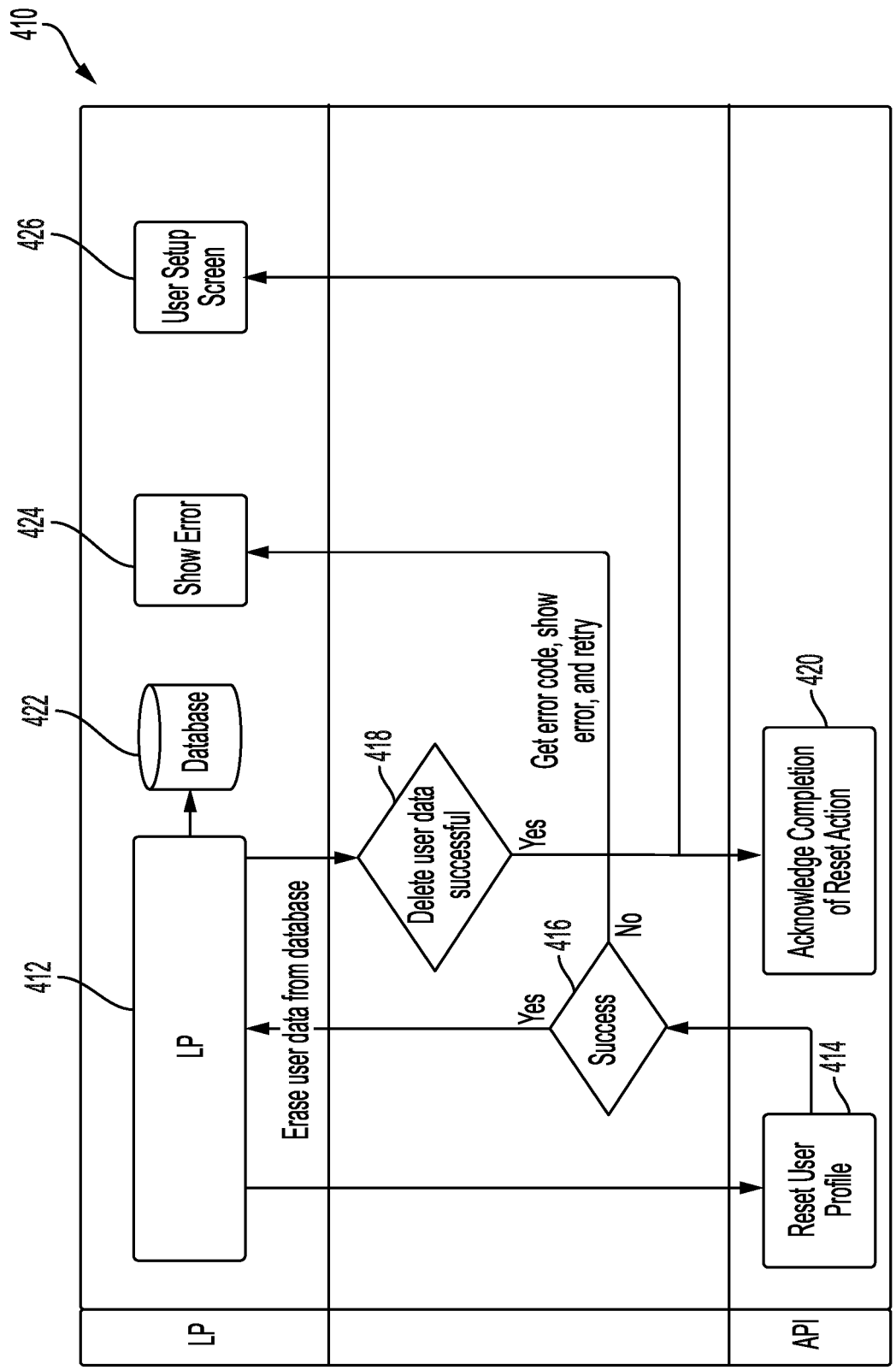

From Fig 14A

The flows below assume that user is logged in to LifePlanner as detailed above

Creating Category Flow

| User activity | LifePlanner system activity (high level) | LifePlanner system activity (API level) |
|---|---|---|
| 1 Click Add+ button on dashboard to create new category | Present user with multi step category setup wizard | |
| 2 Specify category name, description, color, icon, and category fields | Allow user to move between wizard screens | |
| 3 Preview and Save the category structure | Display Confirmation of category creation and go back to Dashboard | Write the changes to LifePlanner database |

Adding Segment Flow

| User activity | LifePlanner system activity (high level) | LifePlanner system activity (API level) |
|---|---|---|
| 1 Click required category from the category selector ribbon | Display the Category title and description, along with any segments already created | |
| 2 Click Add or + sign to add a new segment for data entry | Allow user to input details as per segment template Display segment save confirmation | Read existing segments from LifePlanner database |
| 3 Save changes | | Write change to LifePlanner database |

From Fig 14B

Update User Profile flow

| User activity | LifePlanner system activity (high level) | LifePlanner system activity (API level) |
|---|---|---|
| 1 From the dashboard view, user clicks "Account Settings" from the left navigation | Display the user profile elements to the user, allowing the user to change the name, password, or security questions | Change user profile |

Onboard Browser Invocation Flow

| User activity | LifePlanner system activity (high level) | LifePlanner system activity (API level) |
|---|---|---|
| 1 From the dashboard view, user clicks Launch Onboard Browser from the left navigation | LifePlanner opens up the Onboard Browser for the user in a separate window | Launch Onboard Browser |

Forgot Password Flow

| User activity | LifePlanner system activity (high level) | LifePlanner system activity (API level) |
|---|---|---|
| 1 Start LifePlanner using device platform manager application<br>2 Click Forgot Password at Login screen<br>3 Answer security questions<br>4 Provide a new password | Present user with 2 out of 5 security questions created during setup<br>Validate answers to security questions<br>Set the new password for application | |

FIG. 14C

SYSTEMS AND METHODS FOR PROVIDING SECURE DATABASE INTERFACE SYSTEMS WITHIN AN ENCRYPTED DEVICE SYSTEM

PRIORITY

The present application claims priority to U.S. Provisional Patent Application Ser. No. 62/711,038, filed Jul. 27, 2018, the disclosure of which is hereby incorporated by reference in its entirety.

BACKGROUND

The invention generally relates to hardware encrypted storage devices, and relates in particular to interface systems to hardware encrypted storage devices.

Hardware encrypted storage devices have been available for years (e.g., USB flash drives and hard drives). Likewise, software and/or cloud-based applications to store user data in a graphical, easy to organize format have also been increasingly available and popular for a range of use cases. Many of the hardware encrypted storage devices available have been plug and play modules that, when unlocked, provide a user access to the available storage area within the device.

There is typically however, no additional functionality beyond raw data storage. There have also been a wide range of cloud-based solutions designed to manage and store sensitive user information in a secure location. Due to a range of security breaches that have occurred and been reported in news media however, from both external and insider threats, there is a sense of discomfort for users to rely on unknown/untrusted third parties to store such sensitive personal information.

There are also software solutions that store information in a database-type application that may be contained on a local computing machine or portable device. There are inherent security concerns here as well since the security application and the hardware of the machine/device are not truly integrated as a complete solution.

There have not been hardware encrypted storage devices however, that solve a need for providing easily accessible, secure storage of user data through an organized interface.

Further, as the use of commerce (e.g., banking and purchasing goods) over wireless communication systems such as the Internet becomes more widespread, the requirements for assigning and maintaining (remembering) passwords have greatly increased. Not only is more and more sensitive data being made available on-line for specific registered users (e.g., customers), the customers need to keep records of a large number of accounts, account numbers, contact information, healthcare information, and investment information. Dispersing storage of such information runs the risk of losing some of the information, while combining all of the information into one storage device increases the exposure if access to the device is compromised.

There is a need therefore, for an improved hardware encrypted storage device that provides secure storage in a secure and user-friendly interface system.

SUMMARY

In accordance with an embodiment, the invention provides an encrypted device system that includes an interface for providing the transmission of data between an encrypted data storage medium and a computer system such that a user-interactive application program may be accessed and used via the computer system.

In accordance with another embodiment, the invention provides a storage device system that includes an independently encrypted database application that is adapted to operate specifically when it identifies certain device specific hardware criteria recognized within the storage device.

BRIEF DESCRIPTION OF THE DRAWINGS

The following description may be further understood with reference to the accompanying drawings in which:

FIG. 4A shows an illustrative diagrammatic view of a dashboard image in a system in accordance with an embodiment of the present invention;

FIG. 13 shows an illustrative diagrammatic view of an operational diagram for the resetting of a user profile procedure in a system in accordance with an embodiment of the present invention; and FIGS. 14A-14C shows an illustrative diagrammatic view of a flow index for a system in accordance with an embodiment of the present invention.

The drawings are shown for illustrative purposes only.

DETAILED DESCRIPTION

The disclosure details the architecture of a complete user-interactive database management application stored within a hardware encrypted storage device. The hardware encrypted storage device and user must be authenticated via an entry method (e.g., password, pin, keypad) or another method (e.g., fingerprint, BLUETOOTH™, other wireless, light line of sight, facial recognition, voice recognition, etc.). Once unlocked, the user is able to access a database application that is capable of storing a range of information, data, images, videos, etc. The user may also have access to additional storage space in addition to the database application. This database application may be integrated into an additional application that may be launched/executed as part of the authentication method to unlock the secure partition of the device. The database may or may not have independent security and/or the need for separate authentication.

Figure 1A:
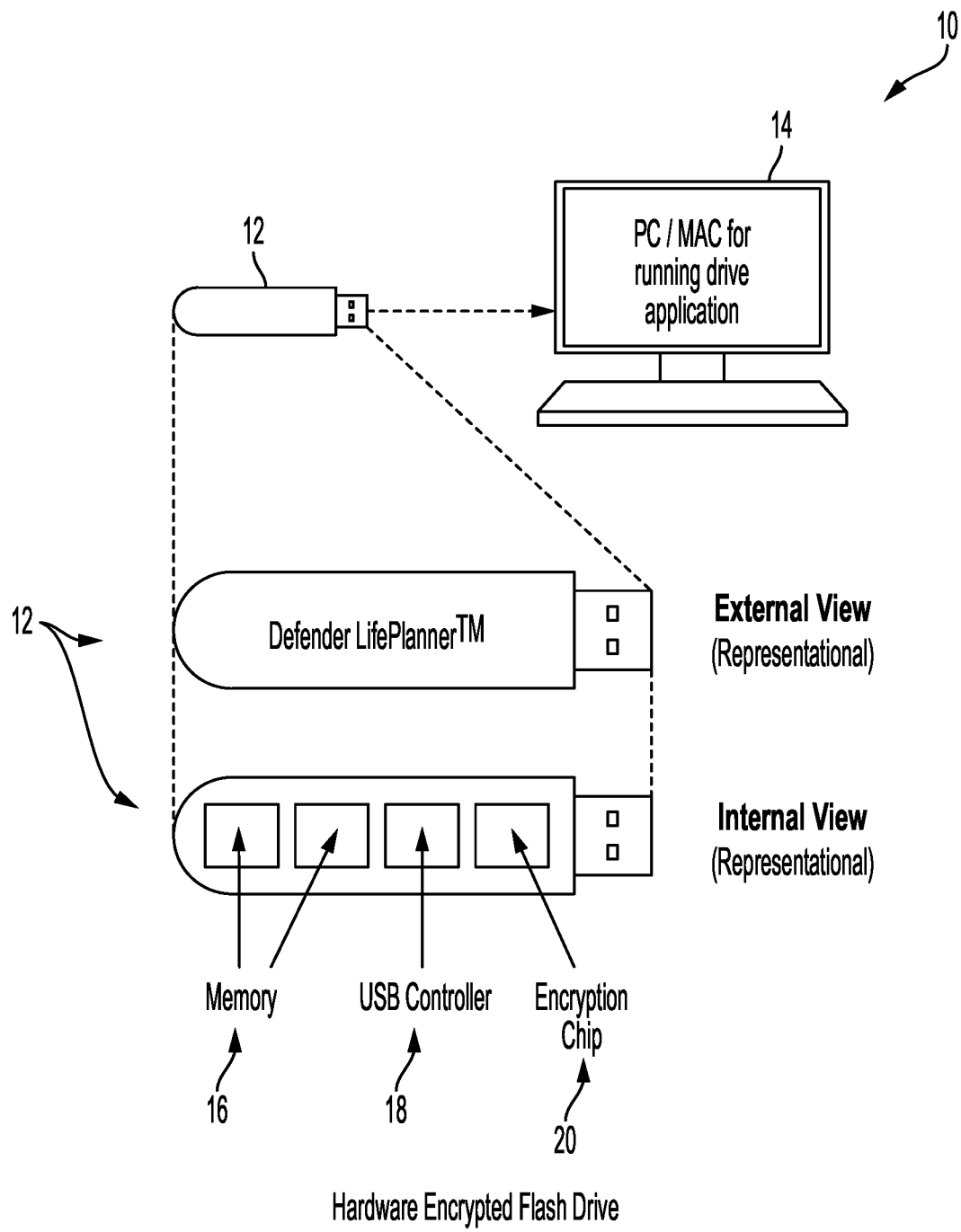
FIG. 1A shows an illustrative diagrammatic view of a hardware encrypted flash drive system in accordance with an embodiment of the present invention.

FIG. 1A for example, shows a system 10 in accordance with an embodiment of the present invention that includes a hardware encrypted storage device 12 as an encrypted flash (Solid State) drive and a computer system 14 such as a personal computer. As further shown in FIG. 1A, the hardware encrypted storage device 12 may include memory and/or storage functionality and controller (e.g., USB controller, cryptographic controller, Network Attached Storage controller, Ethernet controller etc.) functionality for communicating with the computer system 14. A database system may be stored on the device 12, and access to the database system is provided through an authentication interface (e.g., fingerprint, BLUETOOTH™, other wireless, light line of sight, facial recognition, voice recognition, etc.). In certain embodiments, the device 12 may include memory storage 16, a USB controller 18 and an encryption chip 20. The database may be independently encrypted.

This authentication application (e.g., the application referred to herein as the LifePlanner), in accordance with an embodiment, may have direct interaction with the module's firmware or controller through an application programming interface (API) or software developer's kit (SDK) to send and receive commands pertinent to the operation of the device.

Figure 1B:
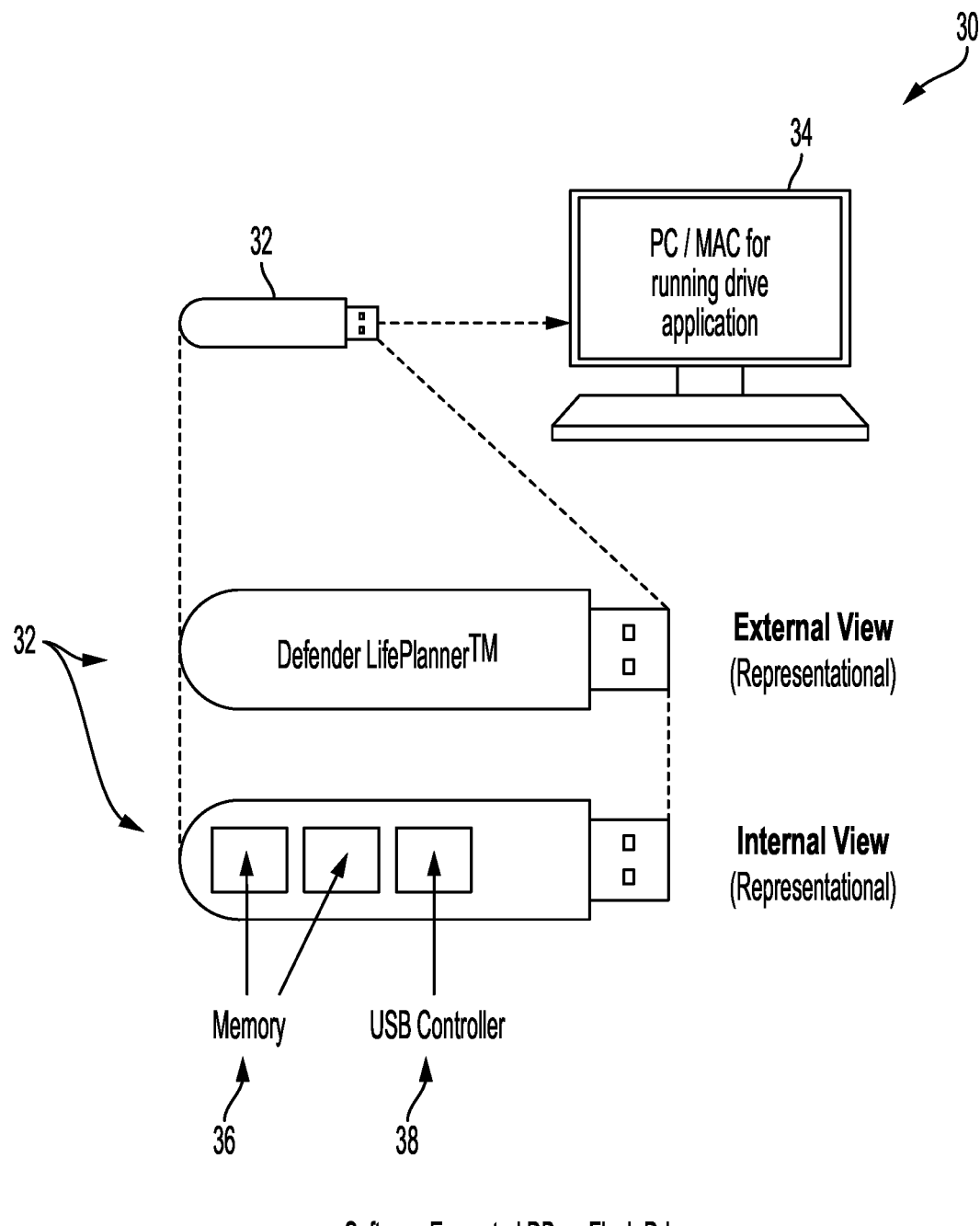
FIG. 1B shows an illustrative diagrammatic view of a software encrypted database on a flash drive system in accordance with an embodiment of the present invention.

FIG. 1B shows a system 30 in accordance with another embodiment of the present invention that includes an unencrypted storage device 32 as a flash (Solid State) drive and a computer system 34 such as a personal computer. As further shown in FIG. 1B, the storage device 32 may include memory and/or storage functionality and controller (e.g., USB controller, cryptographic controller, Network Attached Storage controller, Ethernet controller etc.) functionality for communicating with the computer system 34. A database system incorporating independent software-based encryption may be stored on the device 12, and access to the database system is provided through an authentication interface (again, e.g., password, pin, keypad, fingerprint, BLUETOOTH™, other wireless, light line of sight, etc.). In certain embodiments, the device 32 may include memory storage 36, and a USB controller 38.

Figure 1C:
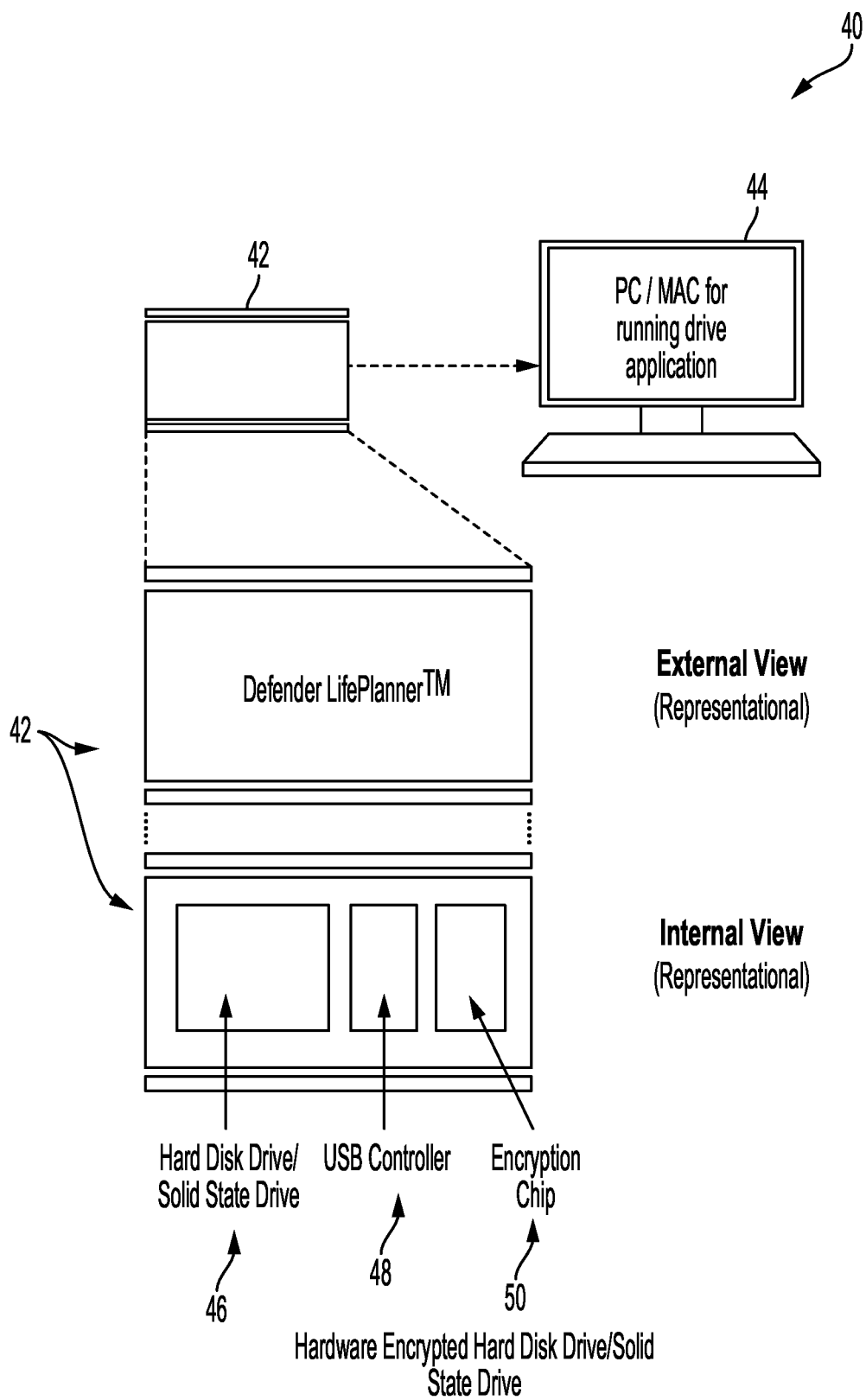
FIG. 1C shows an illustrative diagrammatic view of a hardware encrypted hard disk drive/solid state drive system in accordance with an embodiment of the present invention.

FIG. 1C shows a system 40 in accordance with another embodiment of the present invention that includes a hardware encrypted storage device 42 as an encrypted hard disk drive/solid state drive and a computer system 44 such as a personal computer. As further shown in FIG. 1C, the hardware encrypted hard disk drive/solid state drive 42 may include memory and/or storage functionality and controller (e.g., USB controller, cryptographic controller, Network Attached Storage controller, Ethernet controller etc.) functionality for communicating with the computer system 44. A database system may be stored on the device 42, and access to the database system is provided through an authentication interface (again, e.g., password, pin, keypad, fingerprint, BLUETOOTH™, other wireless, light line of sight, etc.). In certain embodiments, the device 42 may include memory storage 46, a USB controller 48 and an encryption chip 50. The database may be independently encrypted.

Figure 1D:
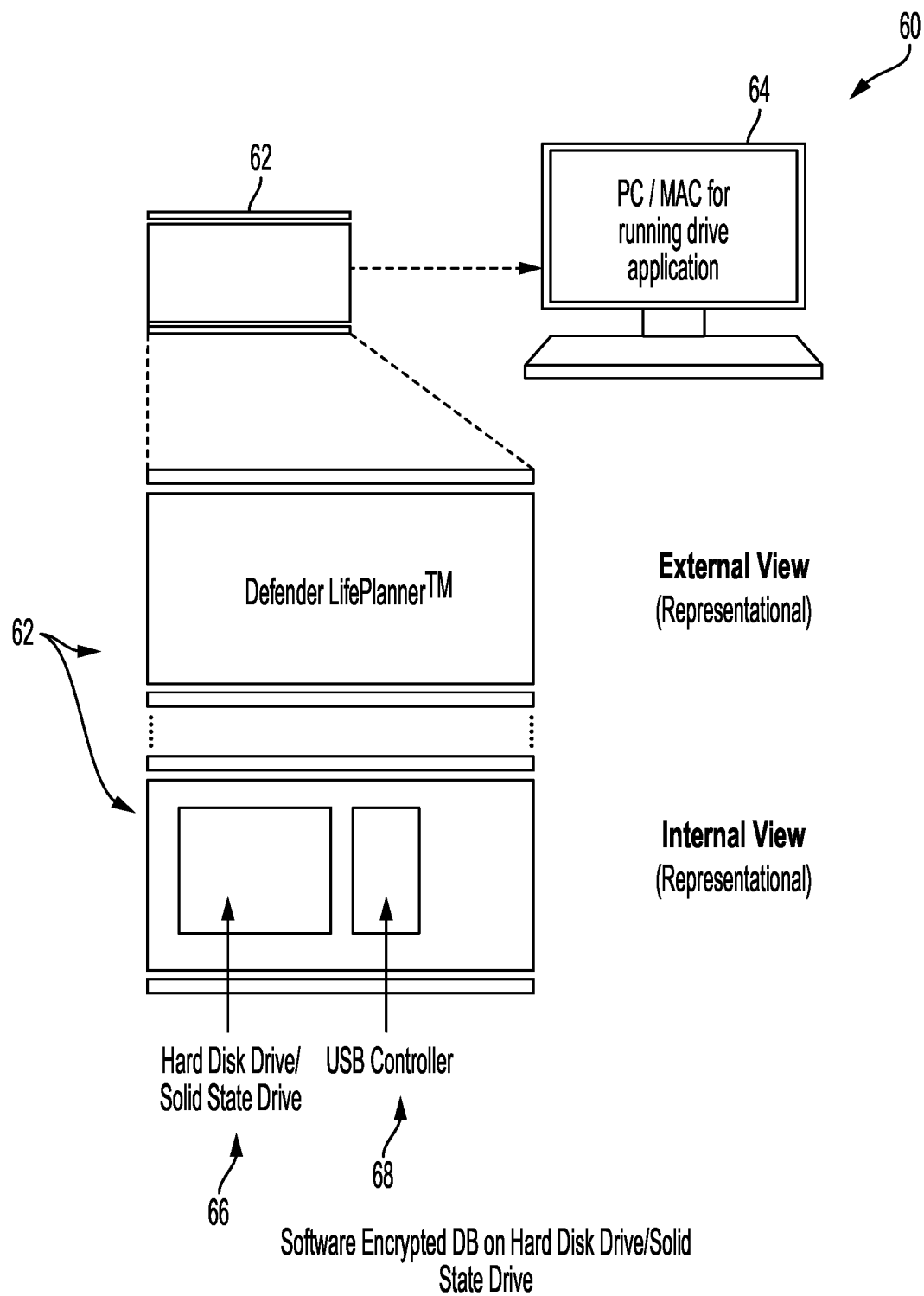
FIG. 1D shows an illustrative diagrammatic view of a software encrypted database on a hard disk/solid state drive system in accordance with an embodiment of the present invention.

FIG. 1D shows a system 60 in accordance with another embodiment of the present invention that includes an unencrypted storage device 62 as a hard disk drive/solid state drive and a computer system 64 such as a personal computer. As further shown in FIG. 1D, the hard disk drive/solid state drive 62 may include memory and/or storage functionality and controller (e.g., USB controller, cryptographic controller, Network Attached Storage controller, Ethernet controller etc.) functionality for communicating with the computer system 64. A database system may be stored on the device 62, and access to the database system incorporating independent software-based encryption is provided through an authentication interface (again, e.g., password, pin, keypad, fingerprint, BLUETOOTH™, other wireless, light line of sight, etc.). In certain embodiments, the device 62 may include memory storage 66, and a USB controller 68.

Figure 1E:
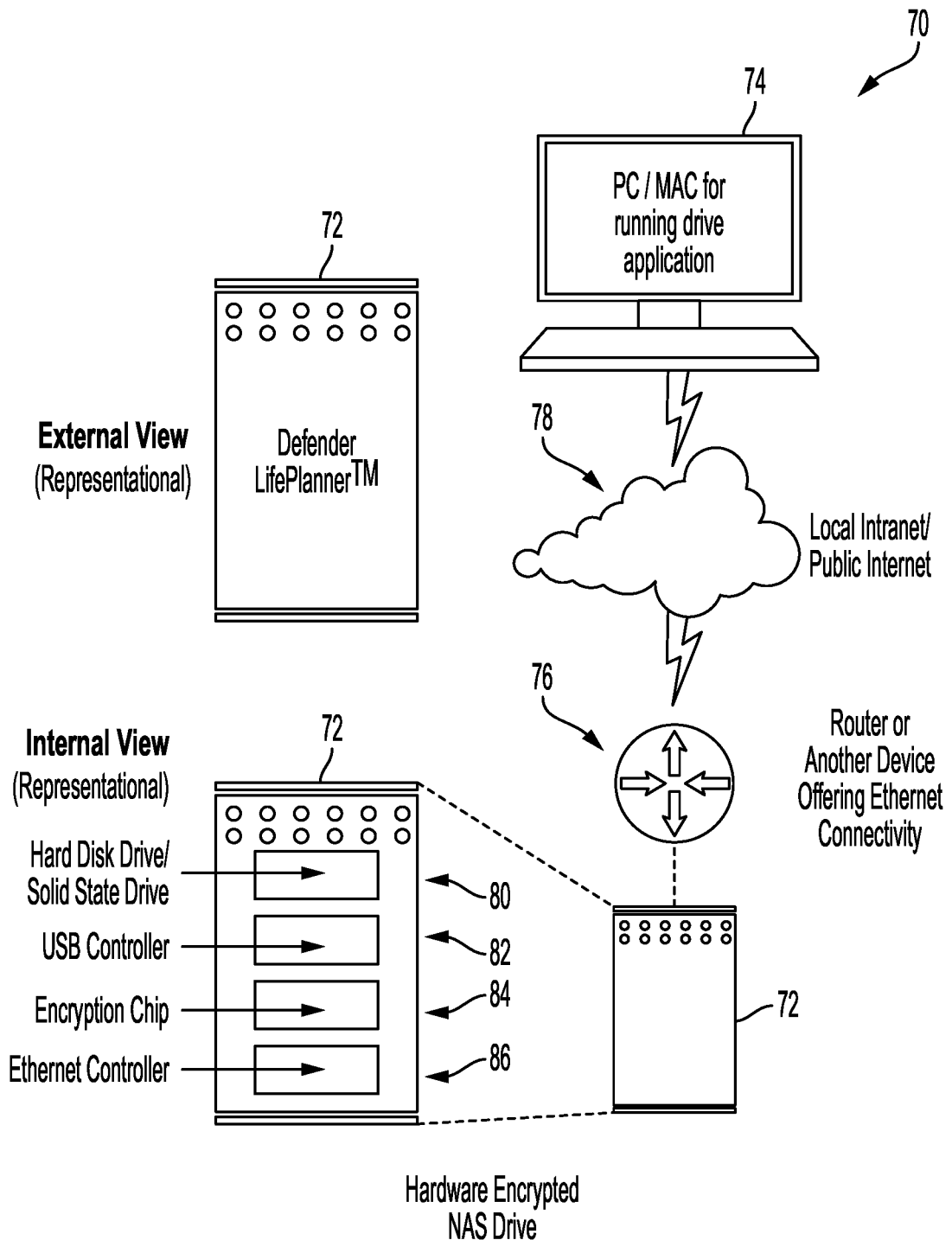
FIG. 1E shows an illustrative diagrammatic view of a hardware encrypted network attached storage drive system in accordance with an embodiment of the present invention.

FIG. 1E shows a system 70 in accordance with another embodiment of the present invention that includes a hardware encrypted storage device 72 as an encrypted Network Attached Storage drive and a computer system 74 such as a personal computer. As further shown in FIG. 1E, the hardware encrypted Network Attached Storage drive 72 may include memory and/or storage functionality and controller (e.g., USB controller, cryptographic controller, Network Attached Storage controller, Ethernet controller etc.) functionality for communicating with the computer system 74 via a router/connectivity device 76 and a network 78. A database system may be stored on the device 72, and access to the database system is provided through an authentication interface (again, e.g., password, pin, keypad, fingerprint, BLUETOOTH™, other wireless, light line of sight, etc.). In certain embodiments, the device 72 may include memory storage 80, a USB controller 82, an encryption chip 84, and an Ethernet controller 86. The database may be independently encrypted.

Figure 1F:
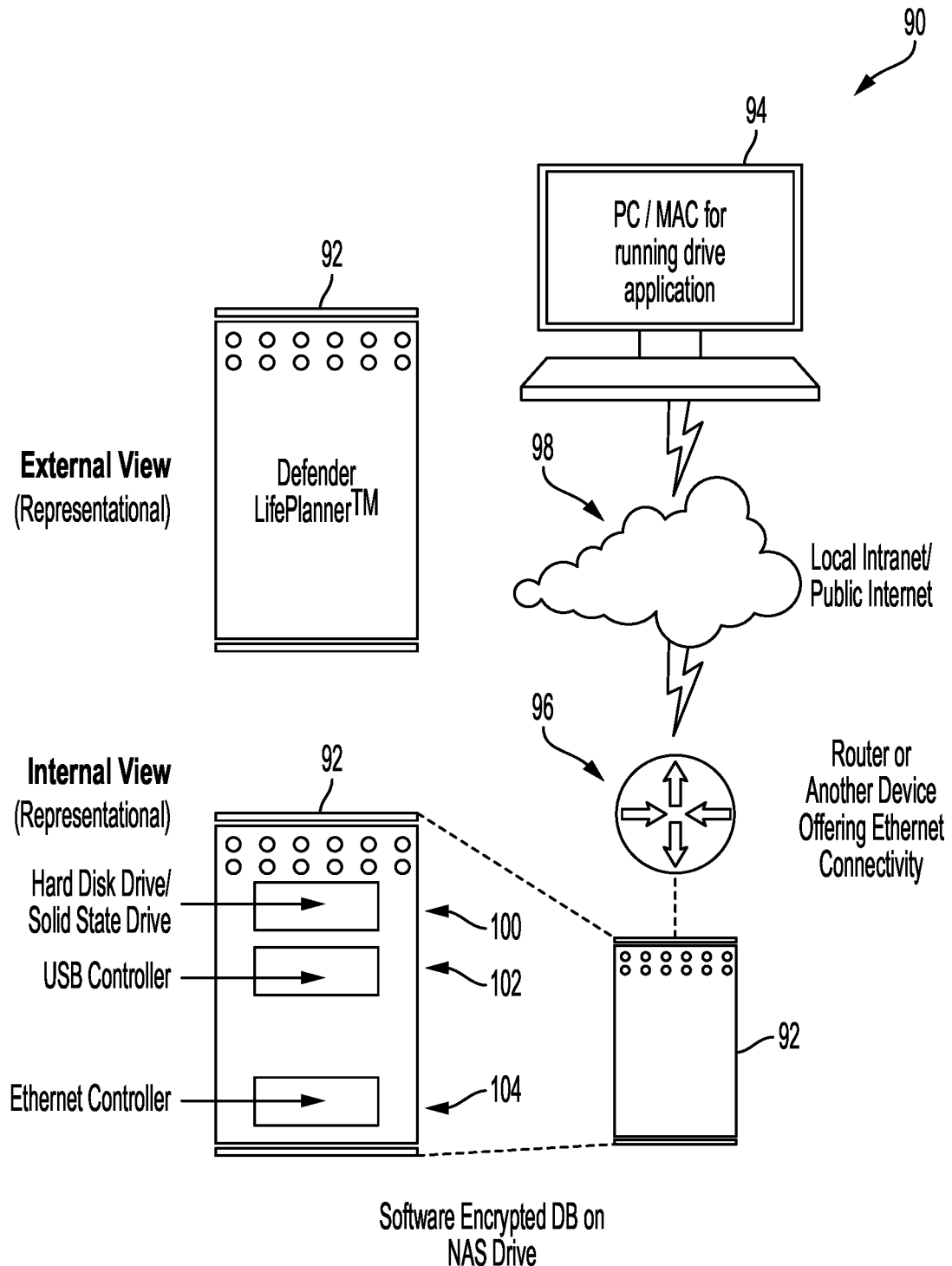
FIG. 1F shows an illustrative diagrammatic view of a software encrypted network attached storage drive system in accordance with an embodiment of the present invention.

FIG. 1F shows a system 90 in accordance with another embodiment of the present invention that includes an unencrypted storage device 92 as a Network Attached Storage drive and a computer system 94 such as a personal computer. As further shown in FIG. 1F, the Network Attached Storage drive 72 may include memory and/or storage functionality and controller (e.g., USB controller, cryptographic controller, Network Attached Storage controller, Ethernet controller etc.) functionality for communicating with the computer system 94 via a router/connectivity device 96 and a network 98 using a network communications connection (SSL, TLS). A database system incorporating independent software-based encryption may be stored on the device 92, and access to the database system is provided through an authentication interface (again, e.g., password, pin, keypad, fingerprint, BLUETOOTH™, other wireless, light line of sight, etc.). In certain embodiments, the device 92 may include memory storage 100, a USB controller 102, and an Ethernet controller 104.

Figure 2:
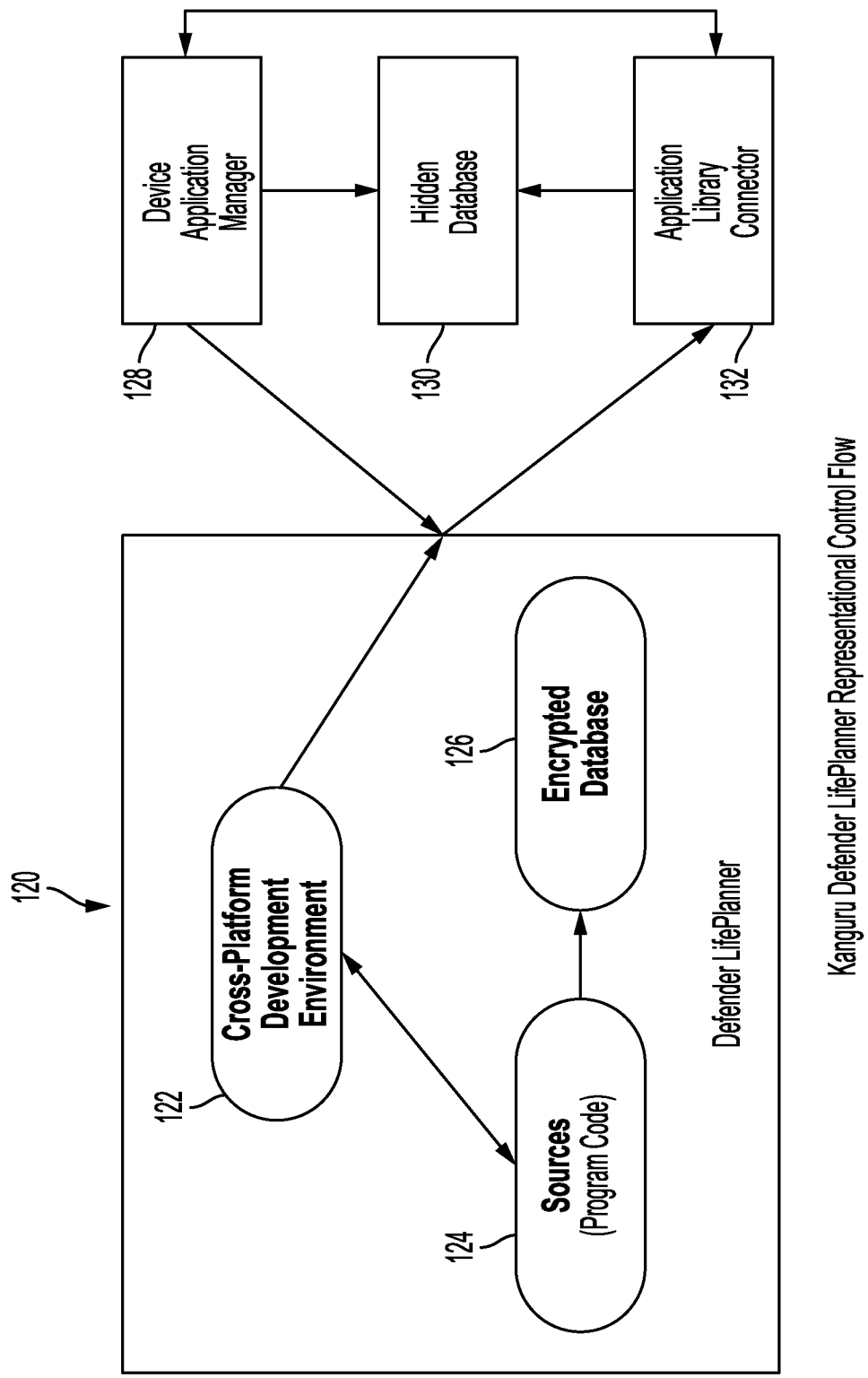
FIG. 2 shows an illustrative diagrammatic view of a representation of control flow in a system in accordance with an embodiment of the present invention.

FIG. 2 shows a system 120 in accordance with an embodiment of the present invention that includes a user-interactive application program. The system 120 includes a cross-platform development environment 122 that communicates with sources (program code) 124, which in turn communicates with an encrypted database 126. The node 122 also communicates with a device application manager 128, a hidden database 130, and an application library connector 132, each of which is also in communication with the other.

Figure 3:
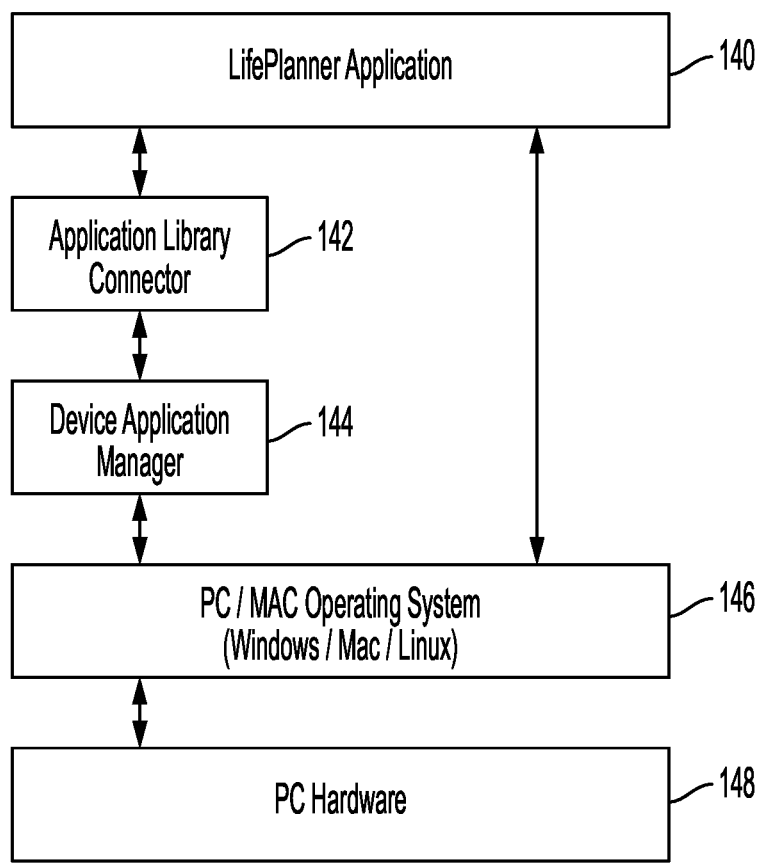
FIG. 3 shows an illustrative diagrammatic view of a representation of a software stack in a system in accordance with an embodiment of the present invention.

FIG. 3 shows a software stack for a system in accordance with an embodiment of the invention. The software stack includes a system application 140, an application library connector 142, a device application manager 144, a PC/MAC computer system operating system 146 (e.g., Windows, Mac, Linux), and computer system hardware 148. Each of the systems also communicate with each other as shown.

The database application, which may or may not be independently encrypted, presents a graphical user interface to the user where a range of information such as account information, personal reference data, and the like is broken out into categories for easy organization, management, and viewing. The system may provide that all personal information is organized and protected and stored in a single safe and convenient place. For example, all banking password, account information, retirement investment/estate planning, online access information, are all securely locked under password protected, military grade, encryption with fingerprint access. The system may use the provided categories or permit a user to customize their own category to build a complete portfolio of their information in the palm of their hand, and to take it with them wherever they travel. The system provides the securing of information, for example, for an aging parent, elder care and estate planning. The system may include a 140-2 certified, level 3FIPS, a 256— bit hardware encrypted AES, independent second layer of AES256-bit encryption to protect an integrated system, and a USB 3.0 interface.

Figure 4B:
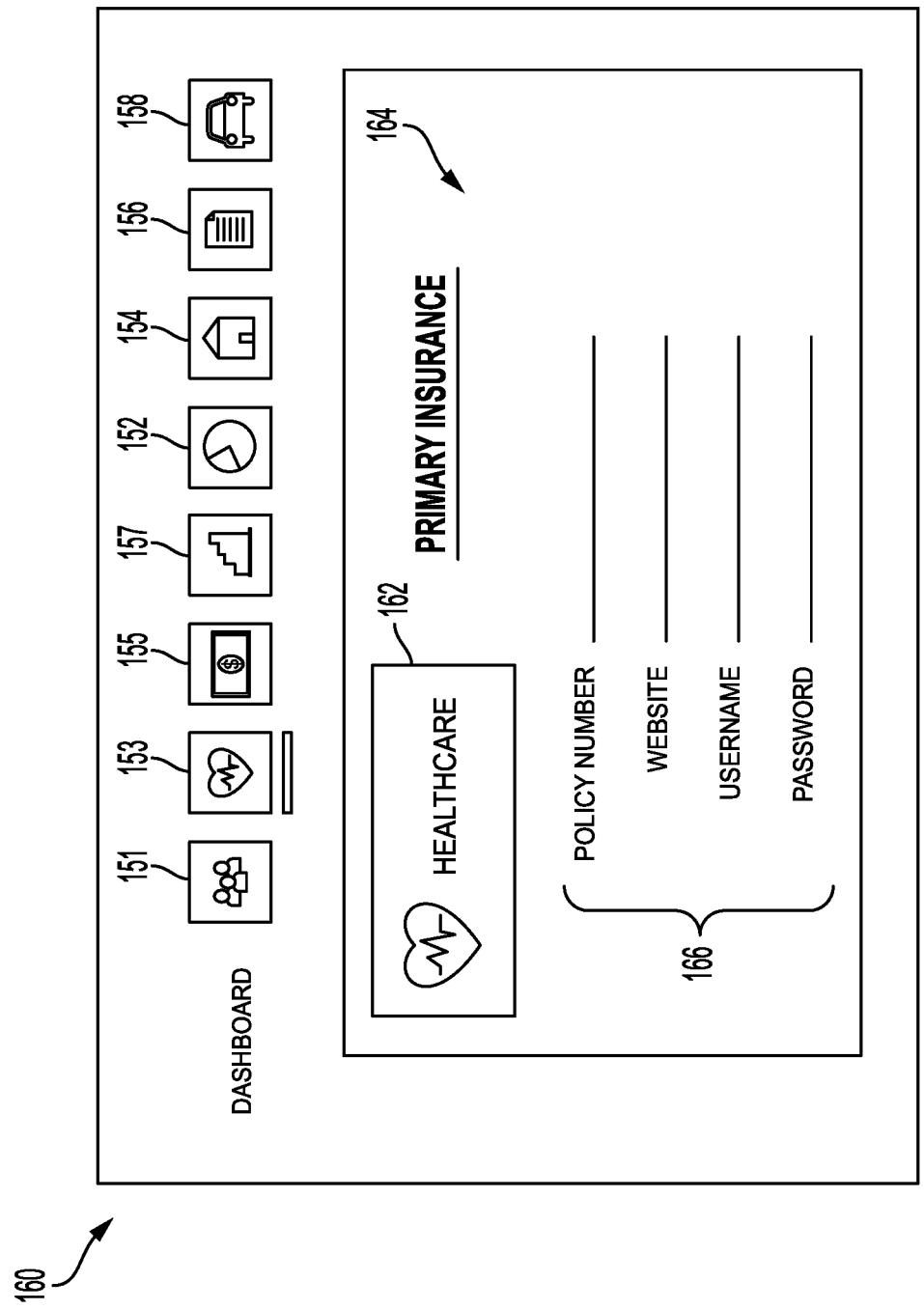
FIG. 4B shows an illustrative diagrammatic view of an input screen through which a user may enter sensitive date in a system in accordance with an embodiment of the present invention.

FIGS. 4A-4D show images of user-interactive interface screens for receiving and storing sensitive information and data. In particular, FIG. 4A shows at 150 a dashboard screen through which a user may select any of a variety of categories, such as contact information 151 (e.g., names, phone numbers, addresses and email addresses), retirement account information 152 (e.g., account names, account numbers and account types), healthcare information 153 (e.g., all healthcare providers, policy numbers and branch locations), real estate information 154 (e.g., real estate locations insurance and management information), banking information 155 (e.g., bank, name, branch address, account type, account number, routing number, and website), tax information 156 (e.g., links to documents and federal, state and local obligations), investment information 157 (e.g., stocks, bonds, and retirement portfolios), and insurance information 158 (e.g., home, auto, personal property, disability and life insurance policies). Through this dashboard, a user may access many further categories of information such as loans and mortgages information, wills and trusts information, education information, and personal property information etc. Any and all may provide account information and access, settings information and access, and permit editing of all access parameters. The system may also permit a user to create or choose new categories and for each new category select a category name and description, as well as create or choose a category color and a category image from among a wide variety of icons.

Figure 4C:
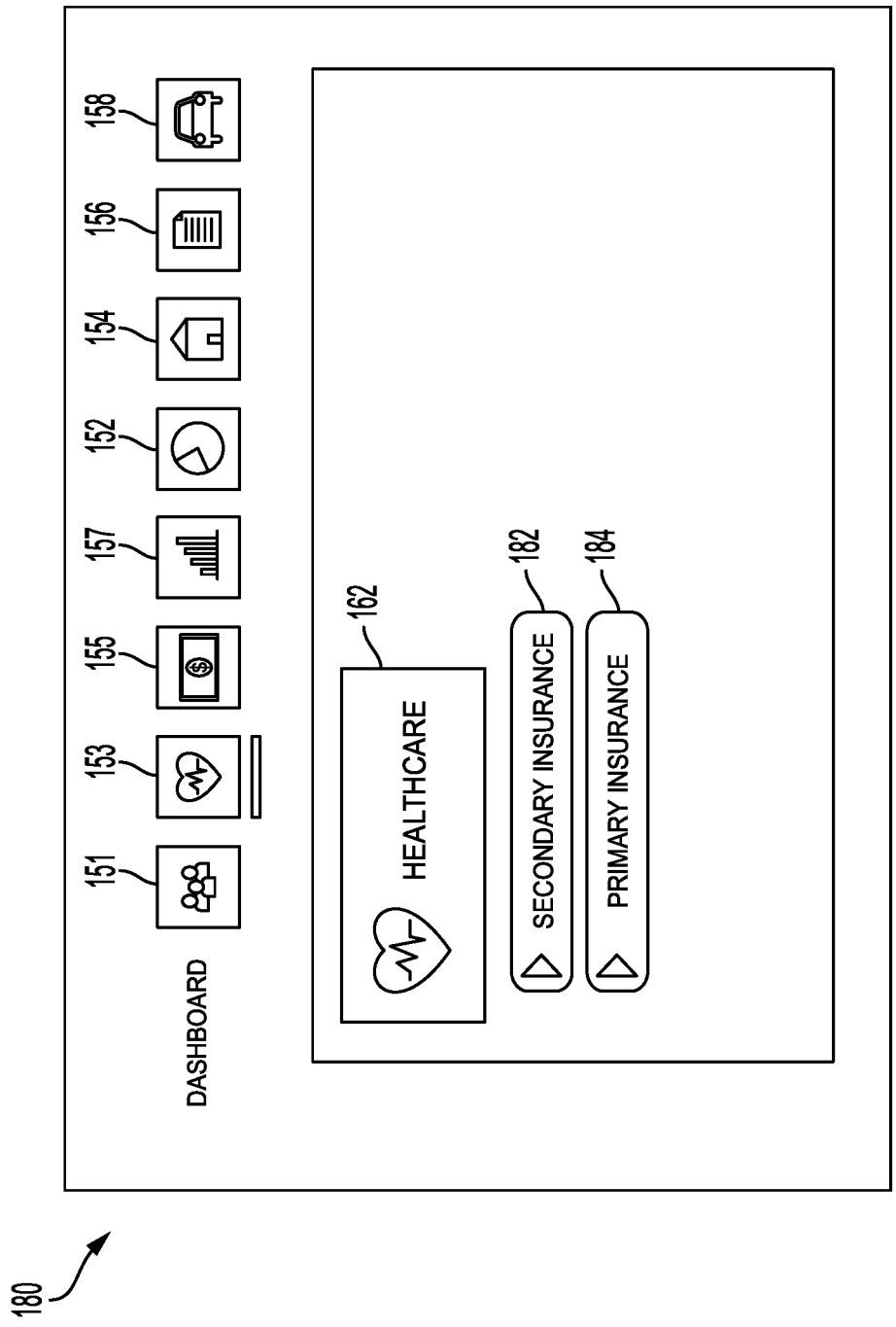
FIG. 4C shows an illustrative diagrammatic view of a selection screen regarding a plurality of insurance policies in a system in accordance with an embodiment of the present invention.
Figure 4D:
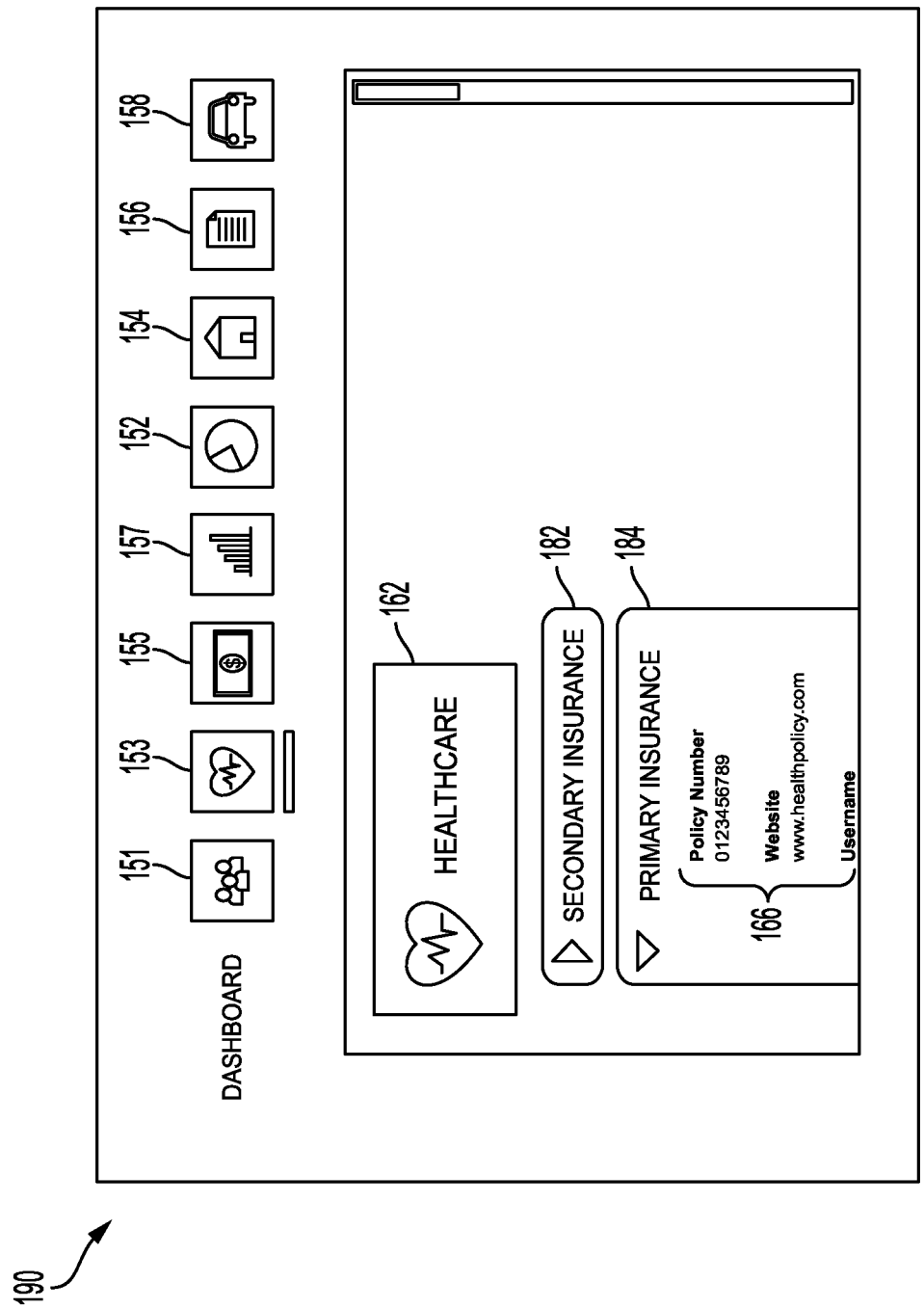
FIG. 4D shows an illustrative diagrammatic view of a viewing screen regarding primary insurance policy sensitive information in a system in accordance with an embodiment of the present invention.

The content and formatting of the new category may then be entered, beginning for example, with any policy number, a policy provider, website, username and password, as well as, in certain examples, a primary Doctor's name and phone number. For example, FIG. 4B shows at 160 an input screen through which data may be input for a particular selection (healthcare), including for example, for a primary insurance policy 164, information 166 including a policy number, website, username and password. FIG. 4C shows at 180 an input screen in a healthcare selection 162 through which a user may enter and select sensitive data regarding primary healthcare insurance policy 184 and a secondary healthcare insurance policy 186. FIG. 4D shows at 190 a view similar to that of FIG. 4C with entered information shown at 166, regarding a primary healthcare insurance policy 184 selected from one of the plurality of polices 182, 184.

For contact information, the system may permit a user to import contact information from another file or application program (either with or without a password). The contact information may also be previewed before importing, to allow for the checking of possible duplicates, review and supply missing information, and permit correcting any errors or updates prior to importing. The system may then also permit a user to select category fields where all information is to be mapped by title, first name, middle name, last name, middle name etc.

In accordance with further embodiments the system may permit a user to set and change recovery information, e.g., by asking questions such as "What was your dream job as child", "What was the name of your first pet", "In which city or town did you attend second grade", "and "What is the birth year of your pet" etc. In accordance with various embodiments, the system may remember websites and associated usernames and passwords, which are then listed separately in a password viewer screen view. The system may permit user to view all of their websites, usernames and passwords at a glance, and to copy the passwords into a computer memory for pasting into a web site.

The disclosed invention combines various technologies to easily navigate sensitive information through a graphical database application which is securely stored within a hardware encrypted storage device. One embodiment of this is integrating an easy to navigate, user-interactive application which has an underlying database (to store user information) and a hardware encrypted storage device such as a USB flash drive/hard drive, etc. The user would plug the device into a host computer, which would recognize the device as a storage unit. After the authentication values are validated by the encryption controller/processor, the secure partition would provide access to the database and/or the data resident within the secure partition. The database application may/may not require additional layers of authentication for access to its contents.

Figure 5:
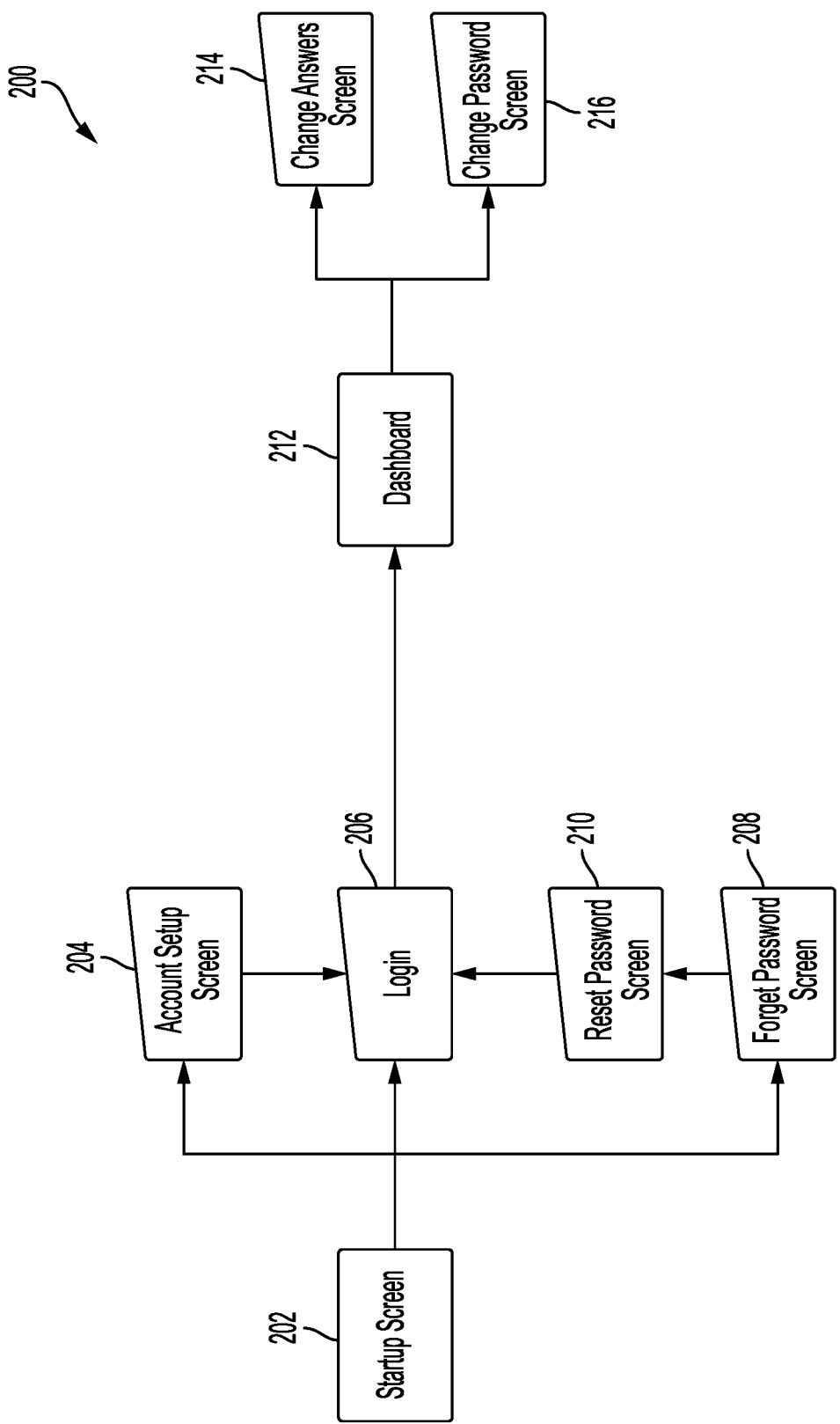
FIG. 5 shows an illustrative diagrammatic view of an operational diagram for a user interface in a system in accordance with an embodiment of the present invention.

FIG. 5 shows at 200 an operation diagram for a user interface in a system on an embodiment of the present invention. The system 200 includes a startup screen 202, which communicates with an account setup screen 204, a login screen 206, a forget password screen 208, and a reset password screen 210. The login screen 204 communicates with a dashboard 212, which communicates with a change answers screen 214 and a change password screen 216.

Figure 6:
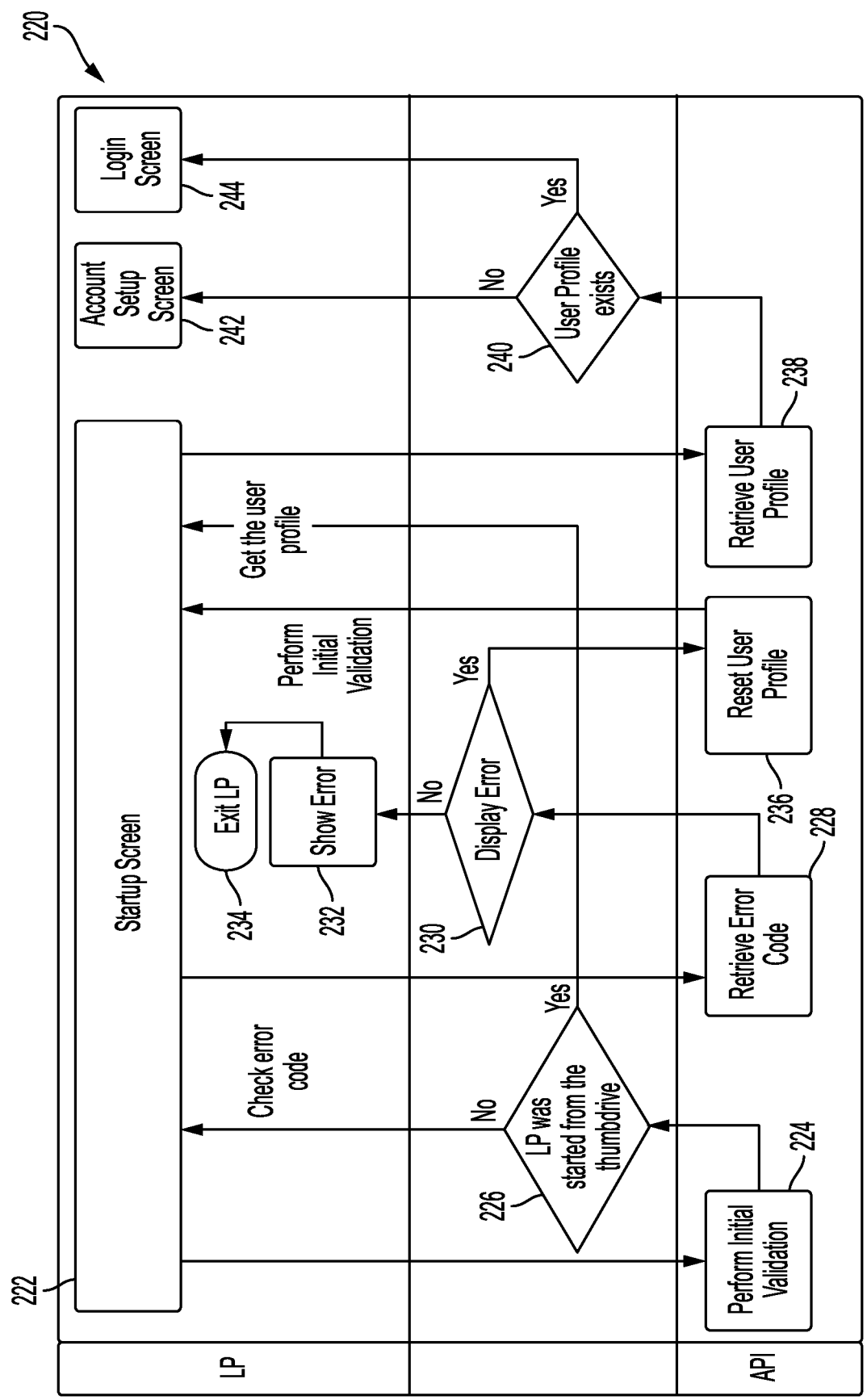
FIG. 6 shows an illustrative diagrammatic view of an operational diagram for a system for starting a system in accordance with an embodiment of the present invention.

FIG. 6 shows at 220 an operational diagram for starting the system. Following the startup screen 222, the system performs initial validation 224. If the program was not started from the hardware encrypted device (226), the system reports an error. If so, the system proceeds to acquire the user's profile. If an error code is retrieved (228), the system will check whether the error should be displayed (230), and if so will reset the user profile (236). If not, the system will show the error (232) and exit the program (234). If a user profile is acquired, the profile (238) is identified as either being new or existing (240), and if new is provided to an account set up screen 242, and if not, to a login screen 244.

Figure 7:
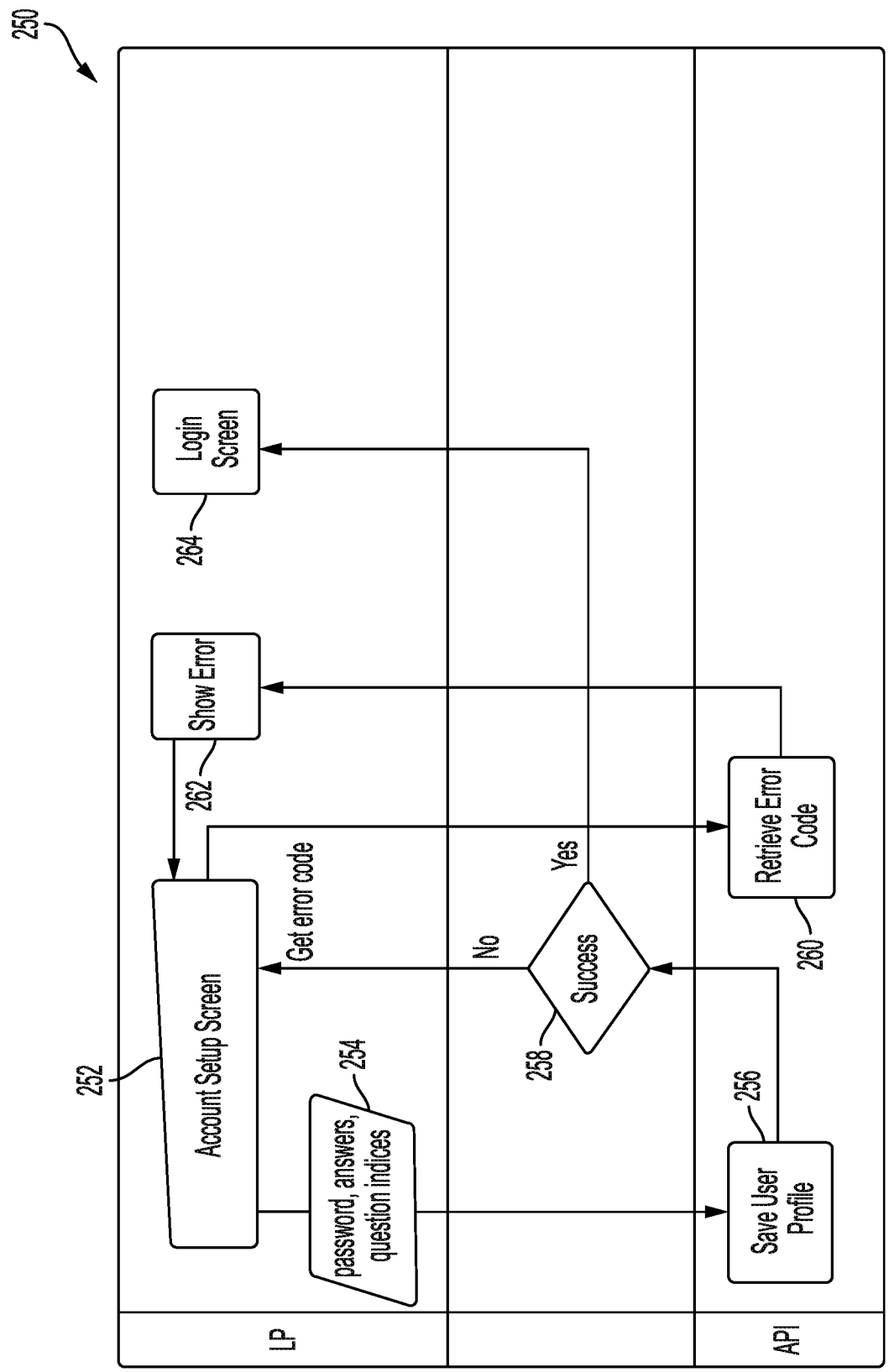
FIG. 7 shows an illustrative diagrammatic view of an operational diagram for an account setup procedure in a system in accordance with an embodiment of the present invention.

FIG. 7 shows at 250 an operational diagram for an account setup procedure. Following the account setup screen 252, the system prompts for a password or answers to question indices 254, saves the user profile 256, and if successful 258 proceeds to the login screen 264. If not successful, the system retrieves an error code 260, which causes the system to show an error 262.

Figure 8:
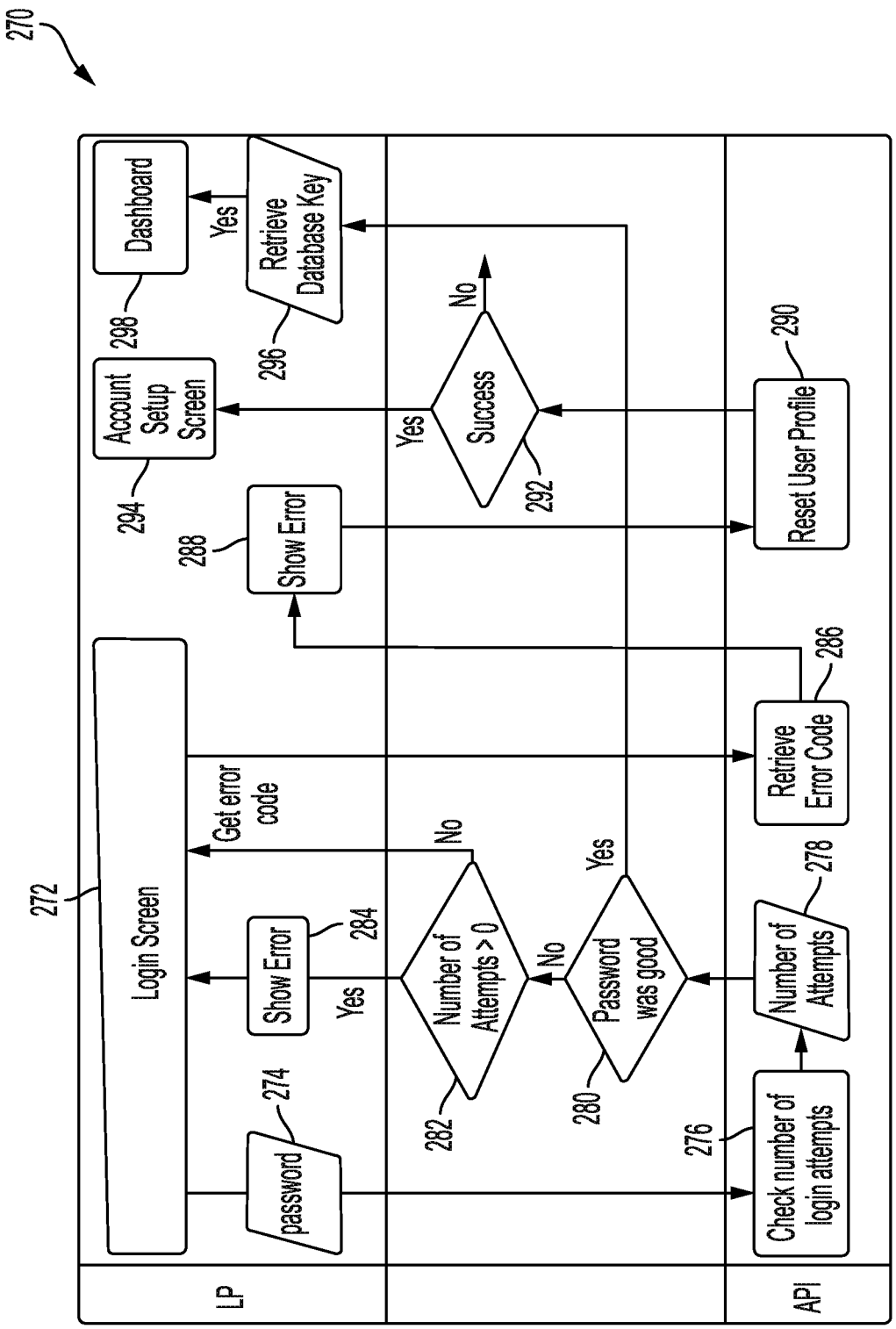
FIG. 8 shows an illustrative diagrammatic view of an operational diagram for a login with password procedure in a system in accordance with an embodiment of the present invention.

FIG. 8 shows at 270 an operational diagram for a login with password procedure, in which the login screen 272 prompts for a password 274, notes and records the number of login attempts 276, 278. If the password is good 280, the system retrieves the database key 296, and proceeds to open the dashboard 298. If the password is not good 280 and the number of attempts is greater than a threshold number 282, then the system shows an error 284. If the number of attempts is below the threshold 282, the system shows an error 286. If the number of attempts is above the threshold 282, the system retrieves an error code 286, shows the error 288, and resets the user profile 290. If these steps are successful 292, the system will provide an account set-up screen 294.

Figure 9:
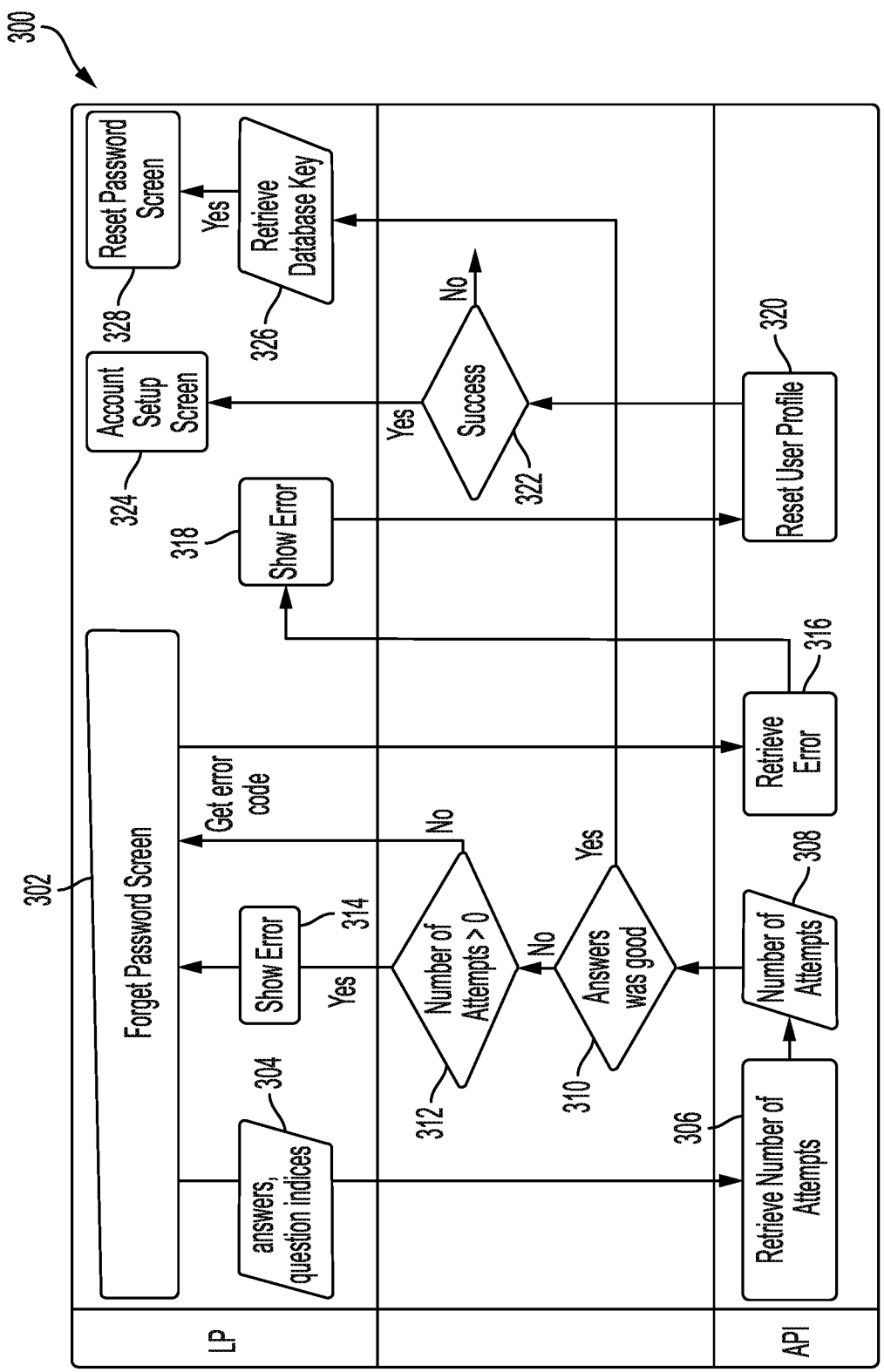
FIG. 9 shows an illustrative diagrammatic view of an operational diagram for a login with answers procedure in a system in accordance with an embodiment of the present invention.

FIG. 9 shows at 300 an operational diagram for a login with answers procedure, in which a forget password screen 302 prompts the user to answer question at login 304. The login attempt(s) 306 are noted and recorded 308, and if the answers are good, the system retrieves the database key 326, and proceeds to open the reset password screen 328. If the password is not good 310 and the number of attempts is greater than a threshold number 312, then the system shows an error 314. If the number of attempts is below the threshold 312, the system shows an error. If the number of attempts is above the threshold 312, the system retrieves an error code 316, shows the error 318, and resets the user profile 320. If these steps are successful 322, the system will provide an account set-up screen 324

Figure 10:
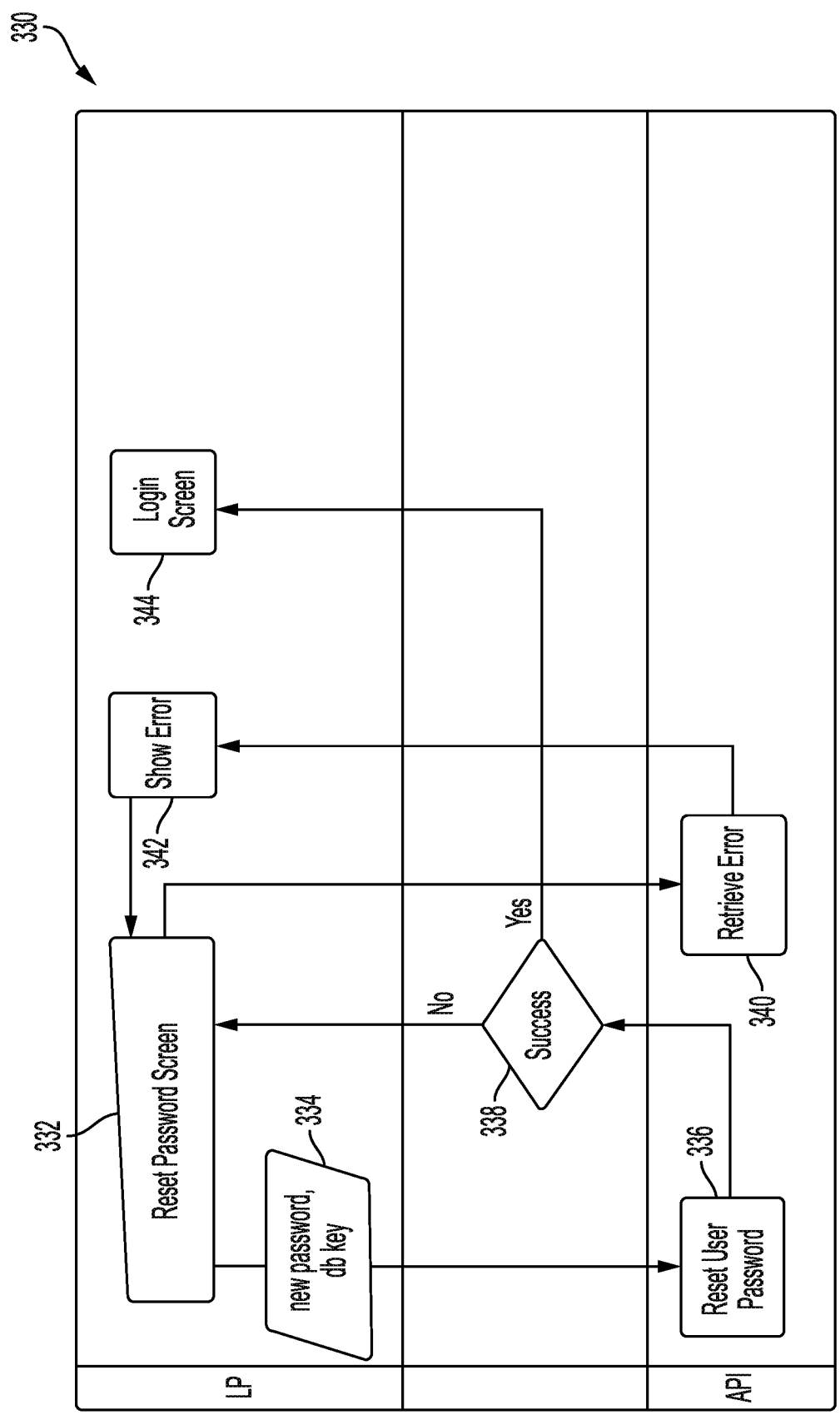
FIG. 10 shows an illustrative diagrammatic view of an operational diagram for a reset password procedure in a system in accordance with an embodiment of the present invention.

FIG. 10 shows at 330 an operational diagram for a reset password procedure, in which the login screen 332 enables a new password database key 334 and begins a reset password routine 336. If the resetting of the password is successful 338, the system proceeds to the login screen 344. If not, the system retrieves an error code 340, and shows an error 342.

Figure 11:
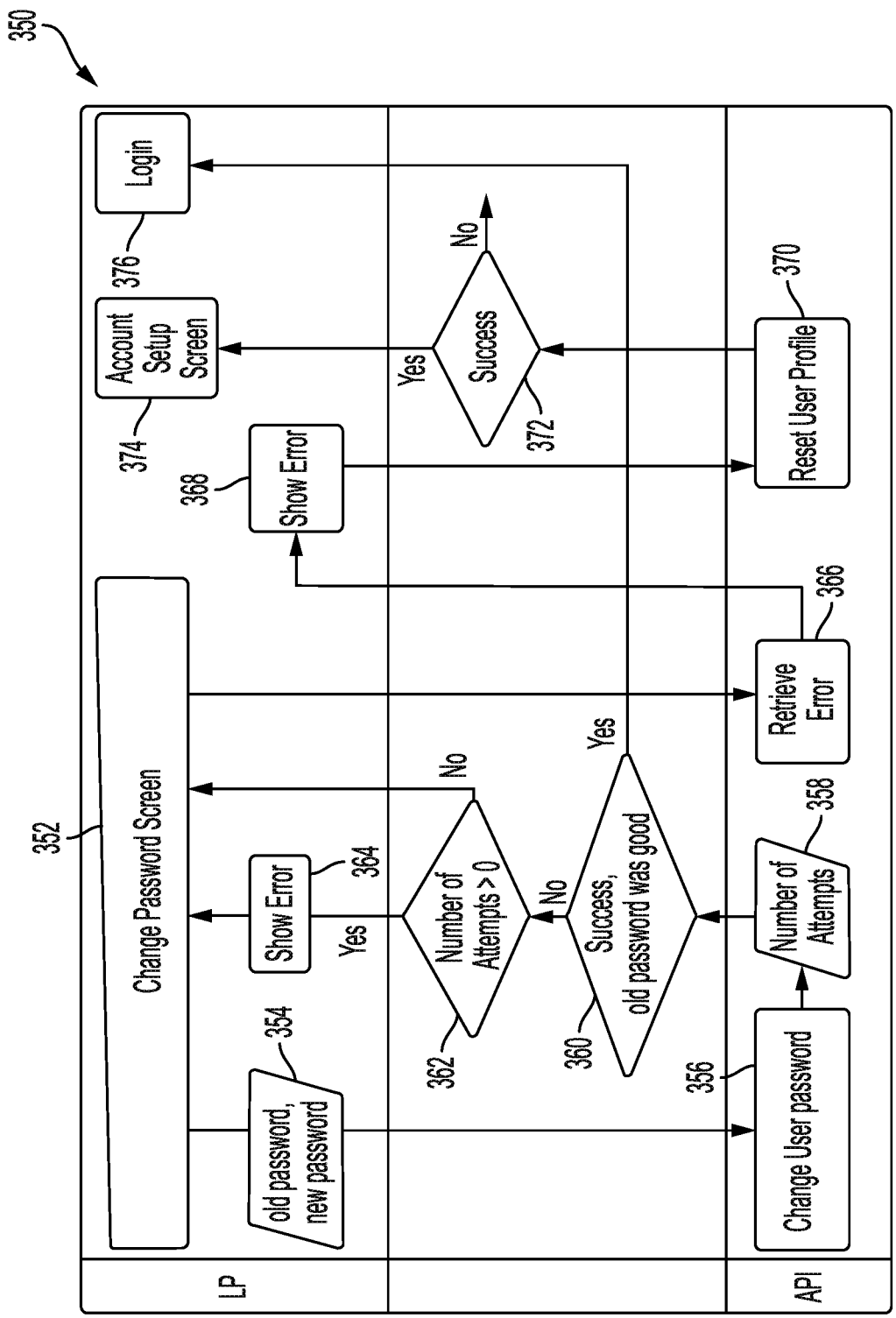
FIG. 11 shows an illustrative diagrammatic view of an operational diagram for a change password procedure in a system in accordance with an embodiment of the present invention.

FIG. 11 shows at 350 an operational diagram for a change password procedure in which a change password screen 352 prompts the old password and new password 354, which are recorded 356. The number of attempts is recorded 358, and if the old password was correct 362, the system permits the login process to continue 376. If the old password was not correct 360, and of the number of attempts is greater than a threshold number 362, then the system shows an error 364. If the number of attempts is below the threshold 362, the system retrieves an error code 366 that causes the error to be shown 368. A prompt is made to reset the security information 370, and if successful 372, the account setup screen is provided 374.

Figure 12:
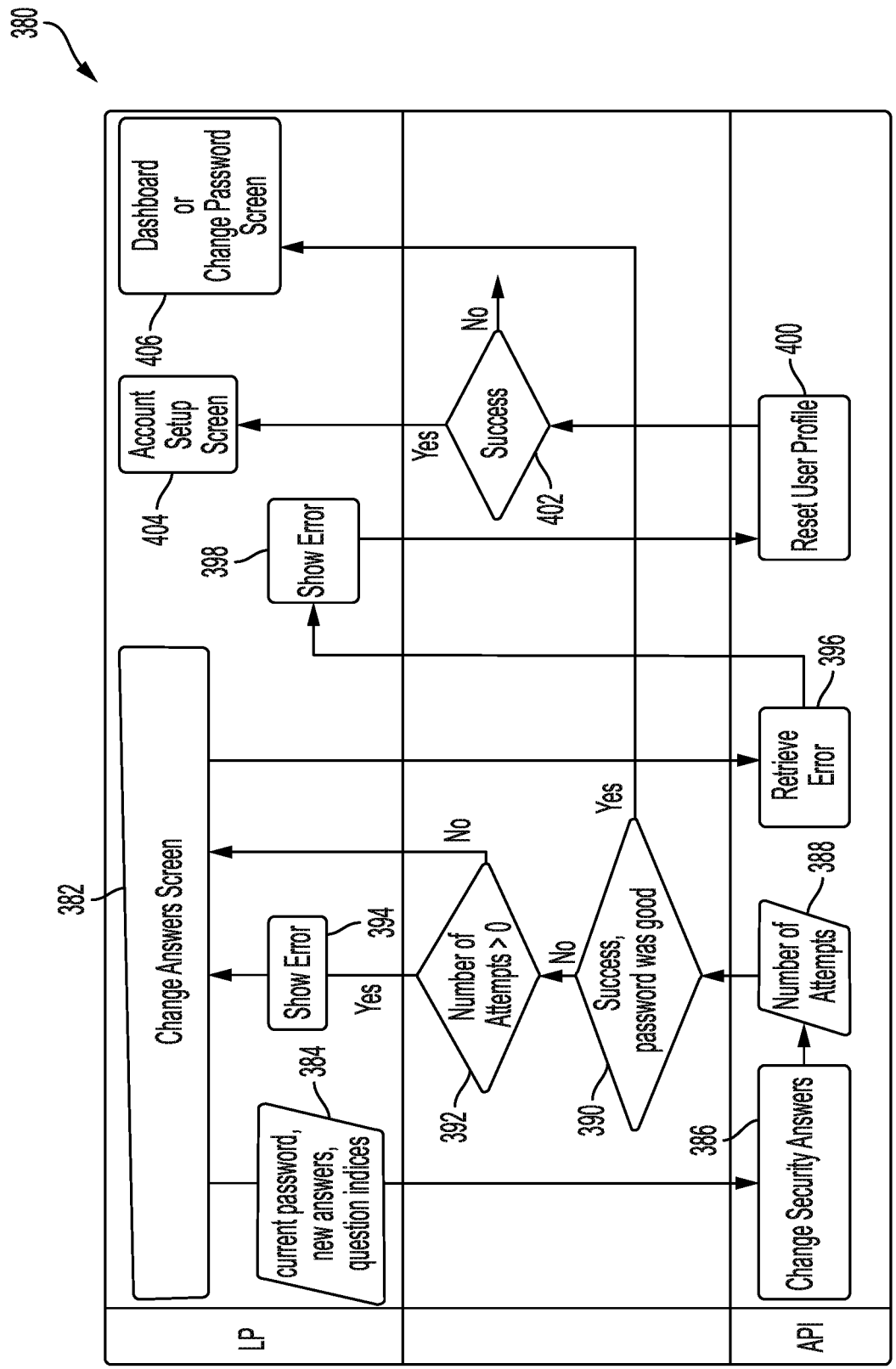
FIG. 12 shows an illustrative diagrammatic view of an operational diagram for a change answers procedure in a system in accordance with an embodiment of the present invention.

Similarly, FIG. 12 shows at 380 an operational diagram for a change answers procedure in which a change answer screen 382 prompts the current password and new answers, new questions indices 384, which are recorded 386. The number of attempts is recorded 388, and if the old password was correct 390, the system permits the login process to continue 406. If the old password was not correct 390, and of the number of attempts is greater than a threshold number 392, then the system shows an error 394. If the number of attempts is below the threshold 392, the system retrieves an error code 396 that causes the error to be shown 398. A prompt is made to reset the user profile 400, and if successful 402, the account setup screen is provided 404.

FIG. 13 shows at 410 an operational diagram for the resetting of the user profile procedure in which a system screen 412 prompts the user to reset the user profile 414. If the reset is successful 416, the system changes the information in the user database, the old data is deleted 418, and an acknowledgment is recorded of the reset action 420. The system then proceeds to the user setup screen. If the change attempt is not successful 416, the system obtains an error code, shows the error 424.

In accordance with an embodiment, the invention provides a portable device that includes an external communications interface configured to enable the transmission of data between the portable device and a host computing platform, and a processor and/or microprocessor with the ability to execute cryptographic processes. In accordance with further embodiments, the invention provides that the processor may or may not force hardware encryption of entire storage or parts of storage area. The device could require a range of authentication options to allow access to contents stored within the secure partition. This could include passwords, passcodes, passphrases, keypads, RFID, smart cards, certificates, biometrics (especially fingerprints), etc.

The portable device may include onboard memory or storage sufficient to store data, and may include a program containing a database that may permit a user to organize and store user data. The database may or may not be encrypted, and is accessible through a graphical user interface (GUI) that allows the user to navigate through the data set. In certain embodiments, there is available functionality to store data within secure partition—whether within the database, or outside of the database. The system may also provide connectivity through a USB type interface (e.g., USB, USB 2x, USB 3x). In further embodiments, the storage medium may be provided by a flash memory (in a variety of form factors), SSD, or spinning hard drives all connectible through a processor/controller supporting USB commands. The database may also be (optionally) restricted to run only if it is stored on a specific authorized USB device. In certain embodiments, the user may have the ability to add, edit, move, and change information residing in the database application through a card-style interactive approach in order to easily sort and search individual information.

Figure 14A:
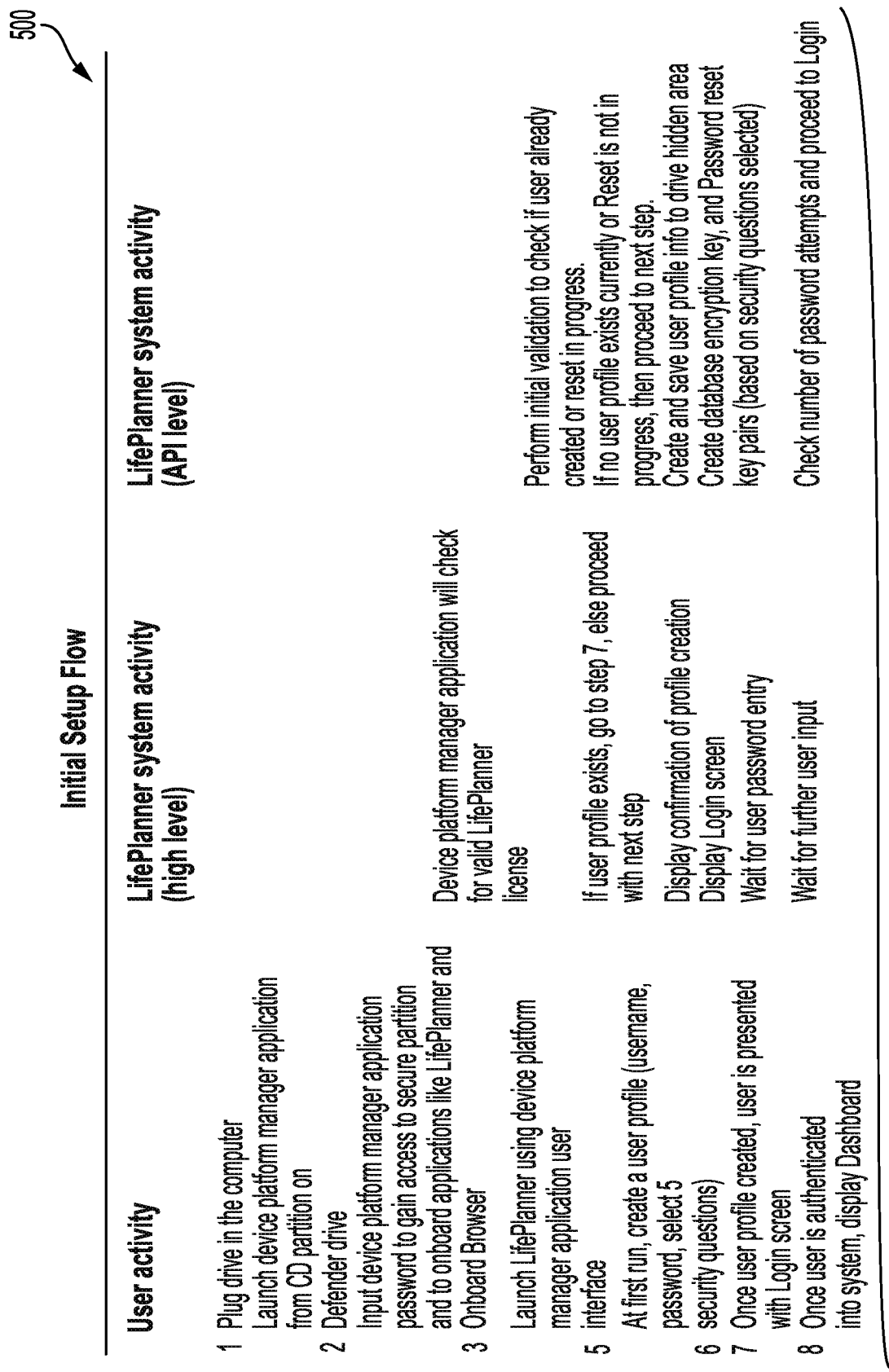

FIGS. 14A-14C show at 500 the flow index for a system in accordance with an embodiment of the present invention. The flow index includes an initial setup flow, a creating category flow, an adding segment flow, an update user profile flow, an onboard browser invocation flow, and forgot password flow as shown. Each of these flows involves user activity, system activity at a high level, and system activity at an API level as shown. As may be seen in FIG. 14A, the user activity begins by plugging a drive into a computer, whereupon the platform manager application is launched. The system then checks for a valid license, and the system (at the API level) performs initial validation to check is the user account has already been created or if a reset is in progress. The flow continues as shown once a user is logged into the system.

Those skilled in the art will appreciate that numerous modifications and variations may be made to the above disclosed embodiments without departing from the spirit and scope of the present invention.

What is claimed is:

1. A portable storage device comprising:
an external communications interface for transmitting to and receiving data from a host computer,
a data storage medium having a secure partition that stores a user-interactive application program and user data, and
a hardware encryption processor that encrypts the secure partition and provides an authentication interface to validate one or more user authentication credentials,
wherein the hardware encryption processor unlocks the secure partition and allows the host computer to start the user-interactive application program for reading and writing the user data on the secure partition in response to validating the one or more user authentication credentials entered through the authentication interface,
wherein the user data is further encrypted using a software-based encryption,
wherein the data storage medium is flash memory, and
wherein the external communications interface is a Universal Serial Bus (USB) interface.

2. The system as claimed in claim 1, wherein the user data includes a database.

3. The portable storage device as claimed in claim 1, wherein the external communications interface is configured to enable encrypted transmission of data between the portable storage device and the host computer.

4. The portable storage device as claimed in claim 1, wherein the hardware encryption processor is configured to execute cryptographic processes.

5. The portable storage device as claimed in claim 1, wherein the user-interactive application program is executed to present a card-style or database table-style graphical user interface.

6. The portable storage device as claimed in claim 1, wherein the user-interactive application is restricted to execute from the secure partition.

* * * * *